United States Patent [19]

Paton et al.

[11] 4,367,104

[45] Jan. 4, 1983

[54] FINELY COMMINUTED WATER-SOLUBLE MATERIALS AND AQUEOUS SUSPENSIONS THEREOF

[75] Inventors: Hugh S. Paton, Irvine; James A. Enever, Kilmarnock, both of Scotland

[73] Assignee: Imperial Chemical Industries Limited, London, England

[21] Appl. No.: 181,344

[22] Filed: Aug. 26, 1980

[30] Foreign Application Priority Data

Sep. 18, 1979 [GB] United Kingdom ............... 7932303

[51] Int. Cl.³ ........................................... C06B 31/52
[52] U.S. Cl. ......................................... 149/7; 149/11; 149/46; 264/3 E; 427/200
[58] Field of Search ............... 149/7, 11, 46; 264/3 E; 427/200

[56] References Cited

U.S. PATENT DOCUMENTS 3,546,034  12/1970  Francis ................................. 149/60
4,055,449  10/1977  Wasson ................................ 149/60
4,084,994   4/1978  Nielsen et al. ....................... 149/60

*Primary Examiner*—Stephen J. Lechert, Jr.
*Attorney, Agent, or Firm*—Cushman, Darby & Cushman

[57] ABSTRACT

Water-soluble crystalline material which has been comminuted in a saturated aqueous solution of the material in the presence of a water-soluble crystal-growth inhibitor having a hydrophobic portion and a hydrophilic portion in its molecular structure is mixed with a deflocculant which inhibits the interaction of the hydrophobic molecular portions whenever the comminuted solid is suspended in water. The viscosity of aqueous suspensions of comminuted solid is thereby stabilized.

The invention is especially beneficial in the preparation of aqueous suspensions of finely comminuted ammonium nitrate for use in slurry blasting explosives.

With crystal-growth inhibitors such as water-soluble polysaccharide derivatives, long chain aliphatic amines, polyacrylic acids, sulphonated nuclear aromatic compounds, sulphonated dyes or sulphonated polymers the preferred deflocculant, which should be different from the crystal-growth inhibitor, may include water-soluble polysaccharide derivatives, polyacrylic acid, polyvinyl pyrrolidone, sodium lignosulphonate and/or a salt of a condensate of naphthalene sulphonic acid with formaldehyde.

14 Claims, No Drawings

FINELY COMMINUTED WATER-SOLUBLE MATERIALS AND AQUEOUS SUSPENSIONS THEREOF

The invention relates to comminutes crystalline materials which are stable when suspended in a saturated solution of said material in a water liquid. The invention is especially useful for providing stable aqueous suspensions of very finely ground ammonium nitrate for slurry blasting explosive compositions.

A slurry explosive generally contains a suspension of inorganic oxidising salt, usually comprising ammonium nitrate and optionally sodium and/or calcium nitrate suspended in a saturated aqueous solution of oxidising salt. Fuels, thickeners, and optionally sensitising ingredients and aerating agents are also usually present in the suspension.

In the preparation of slurry explosives it is generally convenient to prepare a fluid comprising the greater part by weight of the final explosive, which fluid can be easily processed in a pumpable form, yet is not itself explosive. The remaining ingredients are subsequently incorporated into the fluid as required to obtain the explosive. In order to obtain high powered explosives the fluid, (usually termed oxidiser solution) should have a low water content and this is achieved by heating the fluid and/or using a mixture of oxidiser salts. The other ingredients are mixed into the hot oxidiser solution to form the explosive which is then allowed to cool. During cooling oxidiser crystals are precipitated from solutions forming a thick suspension wherein the solid ingredients are effectively immobolised.

It would obviously be more convenient to use the aqueous component in cold conditions and to 'load' it with suspended oxidiser salt but this is not generally favoured because, in the absence of thickener, the normal oxidiser particles tend to segregate from the solution and with sufficient thickener to suspend the particles the solution is too viscous to process. One method of preventing segregation of the suspended particles is to use smaller particles, which are lighter and hence require less thickener to keep them in suspension.

In our copending United Kingdom Application Number 7916946 we have described a process for the comminution of solid material wherein the material is comminuted in the presence of a saturated solution of the solid in a liquid in which the solid has a solubility greater than 1% by weight, and also in the presence of an additive which is at least partly dissolved in the said saturated solution and is capable of at least partially inhibiting crystal growth at both existing crystal surfaces and new crystal surfaces produced by the comminution operation. The process is especially useful for producing water-soluble material including water-soluble oxidiser salts ground to particles of less than 45 microns in diameter (typically 15 $\mu$m) which are sufficiently small in size to require only low levels of thickener to keep them in suspension. The comminuted material may conveniently be prepared as a stable pumpable suspension in the liquid in which it was comminuted. Aqueous suspensions of ammonium nitrate produced by this process are especially advantageous for slurry explosives as the suspension can contain a very high proportion of solid material and low proportion of water and the very fine particle size of the suspended ammonium nitrate confers high sensitivity and gives high velocity of detonation.

The most preferred aqueous suspensions of crystalline materials and particularly of oxidiser salts are made by comminution of the crystalline material in the presence of a crystal-growth inhibitor which adsorbs strongly onto the crystal surface during the comminution process. However due to the interaction of the adsorbed species in solution, these suspensions often have undesirably high viscosities.

It is an object of this invention to provide such comminuted material which will give stable aqueous suspensions of lower viscosity. We have now discovered that the viscosity increasing effect of certain crystal-growth inhibitors can be counteracted by means of deflocculant thereby providing fluid suspensions which are stable at ambient temperatures and can be used at ambient temperatures in the manufacture of slurry explosives which explosives may have low water content and contain a wide range of fuels and sensitisers. Because of their low viscosity the slurry explosives may be pumped easily into boreholes or cartridge shells.

Accordingly this invention provides a water-soluble crystalline material which has been comminuted in a saturated aqueous solution of said material in the presence of dissolved crystal-growth inhibitor having a hydrophobic portion and a hydrophilic portion in its molecular structure, said material being in admixture with a deflocculant whereby flocculation of said material caused by interaction of the said hydrophobic molecular portions is inhibited whenever said material is suspended in water.

The invention also includes an aqueous suspension of comminuted crystals of water soluble material which has been comminuted in a saturated solution of said material in water in the presence of dissolved crystal-growth inhibitor having a hydrophobic portion and a hydrophilic portion in its molecular structure, said suspension also comprising a deflocculant to prevent flocculation of said comminuted crystals by interaction of said hydrophobic molecular portions.

From another aspect the invention consists in a method of preparing a water-soluble crystalline material stable in aqueous suspension wherein comminuted crystals of water-soluble crystalline material, after comminution in a saturated aqueous solution of said material in the presence of dissolved crystal-growth inhibitor having a hydrophobic portion and a hydrophilic portion in its molecule, are suspended in a saturated solution of said material in the presence of a deflocculant which inhibits flocculation of said comminuted crystals caused by interaction of said hydrophobic molecular portions.

Although the comminuted crystals may be separated from the saturated solution in which they were comminuted before treatment with the deflocculant, it is obviously advantageous in some cases to treat the comminuted crystals with deflocculant in the same saturated solution in which they were comminuted without isolating the comminuted crystals. In such cases it is often advantageous when possible to add both the deflocculant and the crystal-growth inhibitor to the saturated solution before the solid is comminuted. Likewise when the end use of the comminuted crystalline material requires the material to be in fluid form as, for example, in a slurry explosive composition, it is advantageous to use the material in suspension in the saturated solution in which it was comminuted and/or treated with deflocculant.

Accordingly from a further aspect the invention consists in a method of preparing a stable aqueous suspension of a water-soluble crystalline material wherein said crystalline material is comminuted in a saturated aqueous solution of said material in the presence of dissolved water-soluble crystal-growth inhibitor having a hydrophobic portion and a hydrophilic portion in its molecular structure and a deflocculant is dissolved in the said solution with the material, whereby flocculation of the comminuted crystals is inhibited.

The amount of water in the suspension should be sufficient to maintain a continuous phase and preferably constitutes from 10 to 40% by weight of the suspension.

By preventing flocculation of the comminuted crystals the invention provides stable lower viscosity suspensions at any given concentration and particle size of comminuted material. Alternatively the invention permits comminution to finer crystals at a given concentration or increased concentration at a given particle size whilst maintaining the same viscosity. Lower viscosity suspensions are preferred as they are more easily mixed with other ingredients and transported by pumping, for example, into drill-holes for blasting.

Smaller particles are also advantageous as they are generally more reactive and, for example, in explosive compositions confer greater sensitivity. The aqueous suspensions of the invention exhibit improved stability on storage in respect of crystal growth and coalescence so that suspensions of ammonium nitrate particles of average crystal size of 20 microns can be stored without significant change at 15° to 25° C. for at least four months.

Crystalline materials which may advantageously be comminuted and modified in accordance with this invention include ammonium nitrate, sodium nitrate, calcium nitrate, potassium chloride, sodium chloride, ammonium phosphate, ammonium polyphosphate, potassium hydrogen phosphate, disodium hydrogen phosphate and urea, the nitrates being particularly useful in the form of stable aqueous suspensions as oxidising constituents of slurry blasting explosives and the remaining compounds being useful in fluid fertiliser or, in the case of sodium chloride, as de-icing fluid for roads. Aqueous slurry explosives may be readily made from the aqueous suspensions of comminuted ammonium nitrate crystals by mixing the suspension with fuel, for example, finely divided metal such as aluminium and, optionally, additional sensitiser, for example, alkylamine nitrate. Conventional ingredients of slurry explosives such as thickeners and gassing agents may also be included without detracting from the advantages of the deflocculant.

The crystal-growth inhibitors suitable for the preparation of the comminuted material of this invention include:

Water soluble polysaccharide derivatives, for example, sodium carboxymethyl cellulose (SCMC); long chain aliphatic amines wherein the aliphatic group preferably contains from 6 to 18 carbon atoms; polyacrylic acids; sulphonated nuclear aromatic compounds, for example, sodium methyl naphthalene sulphonate; sulphonated dyes, for example, acid magenta; sulphonated polymers, for example, sodium lignosulphonate, long chain (C6–C18) alkyl sulphonates and phosphonates and mixtures of any two or more of these inhibitors.

The preferred deflocculants include water-soluble polysaccharide derivatives, for example, sodium carboxymethyl cellulose, polyacrylic acids, polyvinyl pyrrolidone, sodium lignosulphonate and salts, preferably the sodium salt, of condensates of naphthalene sulphonic acid with formaldehyde. Mixtures of any two or more of these deflocculants may be used if desired. It will be noted that some of the materials which are effective deflocculants are also effective crystal-growth inhibitors and in these cases, the preferred crystal-growth inhibitors should be added first, followed by the other chemical, acting as a deflocculant. The time between one addition and the other should be sufficient to allow the crystal-growth inhibitor to adsorb on the crystal surface. In all cases the chemical nature of the deflocculant should be different from that of the crystal-growth inhibitor. For aqueous suspensions of comminuted ammonium nitrate the preferred inhibitor/deflocculant combinations include sodium methyl naphthalene sulphonate/SCMC, sodium methyl naphthalene sulphonate/sodium salt of a condensate of naphthalene sulphonic acid with formaldehyde, SCMC/sodium salt of a condensate of naphthalene sulphonic acid with formaldehyde and acid magenta/sodium salt of a condensate of naphthalene sulphonic acid with formaldehyde.

The concentration of the crystal-growth inhibitor and the deflocculant may vary within wide limits, depending on the particular comminuted crystalline material, its particle size and its phase volume in the desired aqueous suspension. In general, the amount of each of the inhibitor and deflocculant should preferably be in the range from 0.5 to 2.0% of the total weight of the comminuted material.

The invention is further illustrated by the following Examples wherein all parts and percentages are quoted by weight. These Examples refer to the preparation of aqueous suspensions of comminuted oxidiser salts and the production of slurry explosive therefrom but it will be understood that useful suspensions of different solids in fluid fertilisers and other slurries as described in United Kingdom Patent Application No. 7916946 may be prepared using the methods described in these Examples.

In the Examples oxidiser salt particles which originally had average particle size of about 500 microns were ground in a stainless steel ball-mill having a capacity of 5 liters. The mill dimensions were:

| | |
|---|---|
| Internal diameter | 175 mm |
| External diameter | 203 mm |
| Internal length | 193 mm |
| External length | 286 mm |

200 stainless steel balls each 25 mm diameter were used. Using a set of motor driven rollers, the mill was rotated at a maximum speed of about 90 rpm and minimum of 60 rpm, the maximum corresponding to 83% of the critical speed (centrifuging speed).

The viscosity of the suspensions prepared in the Examples were measured at 20° C. by the Brookfield Viscometer using Spindle 4 at 20 rpm.

EXAMPLE 1

84 parts of ammonium nitrate, 0.25 parts of sodium methyl naphthalene sulphonate and 16 parts of water were milled for 90 minutes. The resultant suspension contained ammonium nitrate particles having average diameter of 15 microns. The viscosity of the suspension was 10,000 centipoises.

1.0 part of sodium carboxymethyl cellulose (deflocculant) having degree of substitution 0.7 and molecular weight of about 100,000 was vigorously mixed into the aqueous suspension of ammonium nitrate particles. The viscosity was reduced to 7,500 centipoises.

EXAMPLE 2

84 parts of ammonium nitrate, 0.25 parts of sodium methyl naphthalene sulphonate and 16 parts of water were milled for 45 minutes. 1.0 part of SCMC (as used in Example 1) was then added and milling continued for a further 45 minutes. The resultant aqueous suspension contained ammonium nitrate particles having average diameter of 15 microns and the viscosity of the suspension was 2,500 centipoises.

EXAMPLE 3

84 parts of ammonium nitrate, 0.25 parts of sodium methyl naphthalene sulphonate and 16 parts of water were milled for 45 minutes. 0.5 parts of SCMC and 0.5 parts of sodium salt of naphthalene sulphonic acid/formaldehyde condensate were added and milling was continued for a further 45 minutes. The resultant aqueous suspension contained ammonium nitrate particles having average diameter of 15 microns and the viscosity of the suspension was 1,500 centipoises.

A slurry explosive having the following composition was prepared from the aqueous ammonium nitrate suspension.

|  | Parts |
| --- | --- |
| Ammonium nitrate suspension | 86 |
| Isopropyl nitrate | 7.0 |
| Guar gum | 0.4 |
| Zinc chromate | 0.2 |
| Aluminium granules | 6.4 |

The explosive composition was easily mixed and cartridged at average temperature. When tested in unconfined 83 mm diameter cartridges at density 1.4 g/cc at 5° C. the composition was initiated with 4 g of pentolite (50/50 pentaerythritol tetranitrate/TNT).

EXAMPLE 4

84 parts of ammonium nitrate, 0.25 parts of sodium methyl naphthalene sulphonate and 16 parts of water were milled for 45 minutes. 0.5 parts of SCMC and 0.5 parts of sodium lignosulphonate were then added and milling was continued for a further 45 minutes. The resultant aqueous suspension contained ammonium nitrate particles having an average particle diameter of 15 microns. The viscosity of the suspension was 2,000 centipoises.

When the process was repeated except that the SCMC and the sodium lignosulphonate were omitted the viscosity of the suspension at 20° C. was 8,500 centipoises.

EXAMPLE 5

84 parts of ammonium nitrate, 0.5 parts of SCMC, 0.5 parts of sodium salt of naphthalene sulphonic acid/formaldehyde condensate and 16 parts of water were milled for 90 minutes. The resultant aqueous suspension contained ammonium nitrate particles having an average particle diameter of 15 microns and its viscosity was 2,000 centipoises.

A slurry explosive of the following composition was prepared from the aqueous suspension of ammonium nitrate:

|  | Parts |
| --- | --- |
| Ammonium nitrate suspension | 59.3 |
| Ammonium nitrate prills | 16.7 |
| Aluminium powder | 12.1 |
| Sodium nitrate | 5.0 |
| Guar gum | 0.6 |
| Zinc chromate (crosslinker) | 0.2 |
| Isopropyl nitrate | 6.1 |

The composition had density 1.40 g/cc and when tested in 83 mm diameter cartridges unconfined at 5° C. detonated with a detonator having a base charge of 0.8 g PETN. With a similar aqueous ammonium nitrate suspension but without the sodium salt of naphthalene sulphonic acid/formaldehyde condensate (deflocculant) the explosive composition could not be properly mixed. Adequate mixing could only be obtained if the viscosity of the ammonium nitrate particles in the suspension was kept low by comminuting to average particle diameter of only 25 microns rather than the 15 microns average which was possible using the deflocculant. The composition without the deflocculant was more difficult to pump and cartridge and had a greater tendency to exude isopropyl nitrate from the gel than the composition containing the deflocculant.

EXAMPLE 6

84 parts of ammonium nitrate, 0.5 parts of acid magenta, 0.5 parts of sodium salt of naphthalene sulphonic acid/formaldehyde condensate (deflocculant) and 16 parts of water were milled for 90 minutes. The resultant aqueous suspension contained ammonium nitrate particles having an average particle diameter of 15 microns and its viscosity was 600 centipoises.

When the process was repeated omitting the sodium salt of naphthalene sulphonic acid/formaldehyde condensate the viscosity of the suspension was 9,000 centipoises.

A slurry explosive having the following composition was prepared from the aqueous suspension of ammonium nitrate containing the deflocculant.

|  | Parts |
| --- | --- |
| Aqueous ammonium nitrate suspension | 87.3 |
| Paint grade aluminium | 4.0 |
| Atomised grade aluminium | 0.5 |
| Guar gum | 0.5 |
| Sodium dichromate | 0.2 |

At a density of 1.46 g/cc this composition detonated in a 32 mm diameter cartridge when initiated with a detonator containing 0.1 g lead azide primary charge and 0.1 g PETN base charge, the velocity of detonation being 3.6 km/second.

To achieve the same sensitivity in an explosive containing a similar suspension of ammonium nitrate but without the deflocculant required the paint grade aluminium to be increased to 5 parts and the density of the composition to be reduced to 1.2 g/cc. Moreover the suspension without the deflocculant was much more difficult to mix into a slurry explosive composition because of its higher viscosity.

EXAMPLE 7

84 parts of ammonium nitrate, 0.25 parts of sodium methyl naphthalene sulphonate and 16 parts of water were milled for 45 minutes. 0.25 parts of SCMC, 0.25 parts of polyvinyl pyrrolidone and 0.5 parts of sodium salt of naphthalene sulphonic acid/formaldehyde condensate were added and milling was continued for a further 45 minutes. The resultant aqueous suspension contained ammonium nitrate particles having average diameter of less than 15 microns and the viscosity of the suspension was 350 centipoises.

EXAMPLE 8

63 parts of calcium nitrate, 4 parts ammonium nitrate and 32 parts of water were milled for 20 minutes. 0.5 parts of SCMC and 0.5 parts of sodium salt of naphthalene sulphonic acid/formaldehyde condensate (deflocculant) were then added and milling was continued for a further 60 minutes.

The resultant aqueous suspension contained calcium nitrate and ammonium nitrate particles having an average particle diameter of 20 microns. The viscosity of the suspension was 27,000 centipoises.

When the process was repeated except that the sodium salt of naphthalene sulphonic acid/formaldehyde condensate was omitted the resultant aqueous suspension contained calcium nitrate and ammonium nitrate particles having an average particle diameter of 22 microns and the viscosity of the suspension was 99,000 centipoises.

EXAMPLE 9

69 parts of potassium nitrate and 30 parts of water were milled for 20 minutes. 0.5 parts SCMC and 0.5 parts of the sodium salt of naphthalene sulphonic acid/formaldehyde condensate were then added and milling was continued for a further 60 minutes. The resultant aqueous suspension contained potassium nitrate particles having an average particle diameter of 10 microns. The viscosity of the suspension was 2,387 centipoises.

When the process was repeated except that the sodium salt of naphthalene sulphonic acid/formaldehyde condensate (deflocculant) was omitted the resultant aqueous suspension contained potassium nitrate particles having an average particle diameter of 35 microns. The viscosity of the suspension was 8,000 centipoises.

EXAMPLE 10

74 parts of sodium nitrate and 25 parts of water were milled for 20 minutes. 0.5 parts of SCMC and 0.5 parts of the sodium salt of naphthalene sulphonic acid/formaldehyde condensate were then added and milling was continued for a further 60 minutes.

The resultant aqueous suspension contained sodium nitrate particles having an average particle diameter of 15 microns. The viscosity of the suspension was 21,000 centipoises.

When the process was repeated except that the sodium salt of napthalene sulphonic acid/formaldehyde condensate (deflocculant) was omitted the resultant aqueous suspension contained sodium nitrate particles having an average particle diameter of 35 microns. The viscosity of the suspension was 36,000 centipoises.

EXAMPLE 11

82 parts of diammonium phosphate, 0.5 parts of acid magenta, 0.5 parts of sodium salt of naphthalene sulphonic acid/formaldehyde condensate and 18 parts water were milled for 90 minutes. The resultant aqueous suspension contained diammonium phosphate particles having an average particle diameter of 80 microns and its viscosity was 1700 centipoises.

When the process was repeated omitting the sodium salt of naphthalene sulphonic acid/formaldehyde condensate the viscosity of the suspension was 5,000 centipoises.

EXAMPLE 12

82.5 parts of diammonium phosphate, 0.25 parts sodium methyl naphthalene sulphonate and 17.5 parts water were milled for 45 minutes. 1.0 part of SCMC was then added and the milling continued for a further 45 minutes. The resultant aqueous suspension contained diammonium phosphate particles having an average particle diameter of 80 microns and its viscosity was 3,600 centipoises.

When the process was repeated omitting the SCMC the viscosity of the suspension was 4,600 centipoises.

EXAMPLE 13

62.5 parts of sodium chloride, 0.5 parts acid magenta, 0.5 parts of sodium salt of naphthalene sulphonic acid/formaldehyde condensate and 37.5 parts water were milled for 90 minutes. The resultant aqueous suspension contained diammonium phosphate particles having an average particle diameter of 15 microns and its viscosity was 3,500 centipoises.

When the process was repeated omitting the sodium salt of naphthalene sulphonic acid/formaldehyde condensate the viscosity of the suspension was 8,000 centipoises.

EXAMPLE 14

62.5 parts of sodium chloride, 0.25 parts sodium methyl naphthalene sulphonate and 37.5 parts water were milled for 45 minutes. 1.0 part of SCMC was then added and the milling continued for a further 45 minutes. The resultant aqueous suspension contained sodium chloride particles having an average particle diameter of 15 microns and its viscosity was 6,000 centipoises.

When the process was repeated omitting the SCMC the viscosity of the suspension was 9,000 centipoises.

EXAMPLE 15

76 parts of ammonium nitrate, 12 parts of calcium nitrate, 0.2 parts of long chain (6 to 18 carbon atoms) aliphatic amine 'ARMAC T', (Registered Trade Mark) made by Armour Hess (Akzo Chemie), 0.5 parts sodium salt of naphthalene sulphonic acid/formaldehyde condensate and 11.3 parts of water were milled for 40 minutes. The resultant aqueous suspension contained ammonium nitrate particles having an average particle diameter of 20 microns and its viscosity was 5,000 centipoises.

When the process was repeated omitting the sodium salt of naphthalene sulphonic acid/formaldehyde condensate the viscosity of the suspension was 11,000 centipoises.

EXAMPLE 16

84 parts of ammonium nitrate, 0.2 parts of 'ARMAC T' 0.5 parts SCMC and 16 parts of water were milled for 60 minutes. The resultant aqueous suspension contained ammonium nitrate particles having an average particle diameter of 20 microns and its viscosity was 3,000 centipoises.

When the process was repeated omitting the SCMC the viscosity of the suspension was 5,000 centipoises.

We claim:

1. A water-soluble crystalline material which has been comminuted in a saturated aqueous solution of said material in the presence of dissolved crystal-growth inhibitor having a hydrophobic portion and a hydrophilic portion in its molecular structure, said material being in admixture with a deflocculant whereby flocculation of said material caused by interaction of the said hydrophobic molecular portions in inhibited whenever said material is suspended in water, the chemical nature of the deflocculant being different from that of the crystal-growth inhibitor.

2. An aqueous suspension of comminuted crystals of water-soluble material which has been comminuted in a saturated solution of said material in water in the presence of dissolved crystal-growth inhibitor having a hydrophobic portion and a hydrophilic portion in its molecular structure, said suspension also comprising a deflocculant to prevent flocculation of said comminuted crystals by interaction of said hydrophobic molecular portions, the chemical nature of the deflocculant being different from that of the crystal-growth inhibitor.

3. A suspension of crystalline material as claimed in claim 2 wherein the said material is selected from the group consisting of ammonium nitrate, sodium nitrate, calcium nitrate, potassium chloride, sodium chloride, ammonium phosphate, ammonium polyphosphate, potassium hydrogen phosphate, disodium hydrogen phosphate or urea.

4. A suspension of crystalline material as claimed in claim 2 wherein the crystal-growth inhibitor is selected from the group consisting of water-soluble polysaccharide derivatives, long chain aliphatic amines wherein the aliphatic group contains more than 6 carbon atoms, polyacrylic acid, sulphonated nuclear aromatic compounds, sulphonated dyes, sulphonated polymers, long chain (C6–C18) alkyl sulphonates, long chain (C6–C18) alkyl phosphonates and mixtures of any two or more of these inhibitors.

5. An aqueous suspension of crystalline material as claimed in claim 4 wherein the crystal-growth inhibitor is selected from the group consisting of sodium carboxymethyl cellulose, long chain aliphatic amines wherein the aliphatic group contains from 6 to 18 carbon atoms, sodium methyl naphthalene sulphonate, acid magenta and sodium lignosulphonate.

6. An aqueous suspension of crystalline material as claimed in claim 2 wherein the deflocculant is selected from the group consisting of water-soluble polysaccharide derivatives, polyacrylic acid, polyvinyl pyrrolidone, sodium lignosulphonate, salts of condensates of naphthalene sulphonic acid with formaldehyde and mixtures of any two or more of these deflocculants.

7. A suspension of a crystalline material as claimed in claim 6 wherein the deflocculant is selected from the group consisting of sodium carboxymethyl cellulose, and sodium salts of condensates of naphthalene sulphonic acid with formaldehyde.

8. An aqueous suspension of crystalline ammonium nitrate as claimed in claim 2 wherein the inhibitor/deflocculant combination is selected from the group consisting of sodium methyl naphthalene sulphonate/sodium carboxymethyl cellulose; sodium methyl naphthalene sulphonate/sodium salt of a condensate of naphthalene sulphonic acid with formaldehyde; sodium carboxymethyl cellulose/sodium salt of a condensate of naphthalene sulphonic acid with formaldehyde and acid magenta/sodium salt of a condensate of naphthalene sulphonic acid with formaldehyde.

9. A crystalline material or a suspension of a crystalline material as claimed in any one of claims 1 to 8 inclusive wherein the amount of each of the crystal-growth inhibitor and the deflocculant is in the range from 0.05 to 2.0% of the total weight of the comminuted material.

10. An aqueous suspension of crystalline material as claimed in claim 2 comprising from 10% to 40% by weight of water.

11. A method of preparing a stable aqueous suspension of a water-soluble crystalline material as claimed in claim 2, wherein comminuted crystals of water-soluble crystalline material, after comminution in a saturated aqueous solution of said material in the presence of dissolved crystal-growth inhibitor having a hydrophobic portion and a hydrophilic portion in its molecule, are suspended in a saturated solution of said crystalline material in the presence of a defloculant which inhibits flocculation of the comminuted crystals caused by interaction of said hydrophobic molecular portions, the chemical nature of the deflocculant being different from that of the crystal-growth inhibitor.

12. A method as claimed in claim 11 wherein said crystalline material is comminuted in a saturated aqueous solution of said material in the presence of dissolved water-soluble crystal-growth inhibitor having a hydrophobic portion and a hydrophilic portion in its molecular structure and a deflocculant is dissolved in the said solution with the material.

13. Aqueous slurry explosive comprising an aqueous suspension of comminuted ammonium nitrate in accordance with claim 2.

14. A method of preparing an aqueous slurry explosive wherein an aqueous suspension of comminuted ammonium nitrate crystals in accordance with claim 2 is mixed with fuel and, optionally, additional sensitiser.

* * * * *